March 9, 1948.    R. N. MOWERY    2,437,358
CABLE SPLICE
Filed May 5, 1947    2 Sheets-Sheet 1
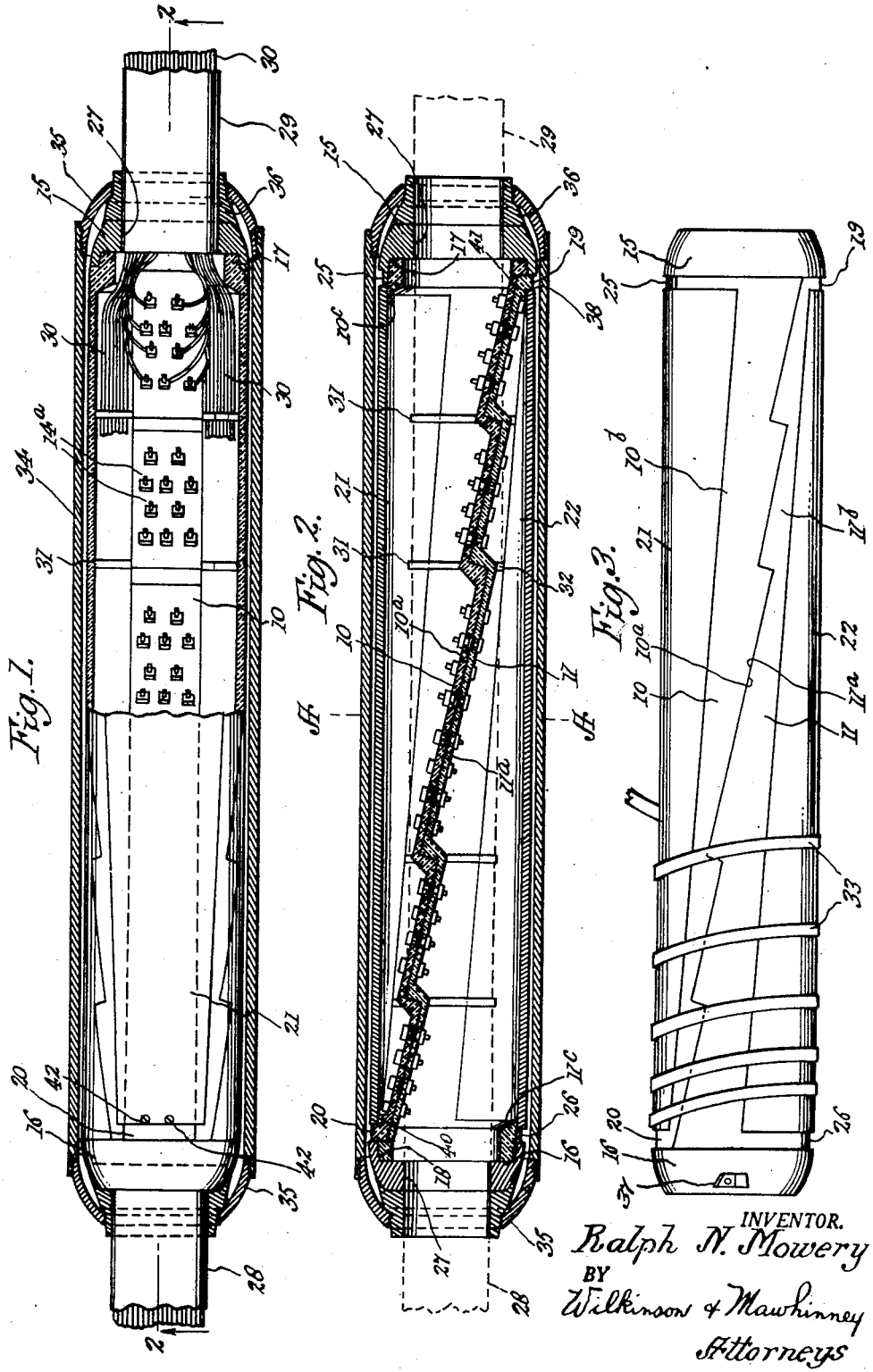
INVENTOR.
Ralph N. Mowery
BY
Wilkinson & Mawhinney
Attorneys March 9, 1948.  R. N. MOWERY  2,437,358
CABLE SPLICE
Filed May 5, 1947  2 Sheets-Sheet 2
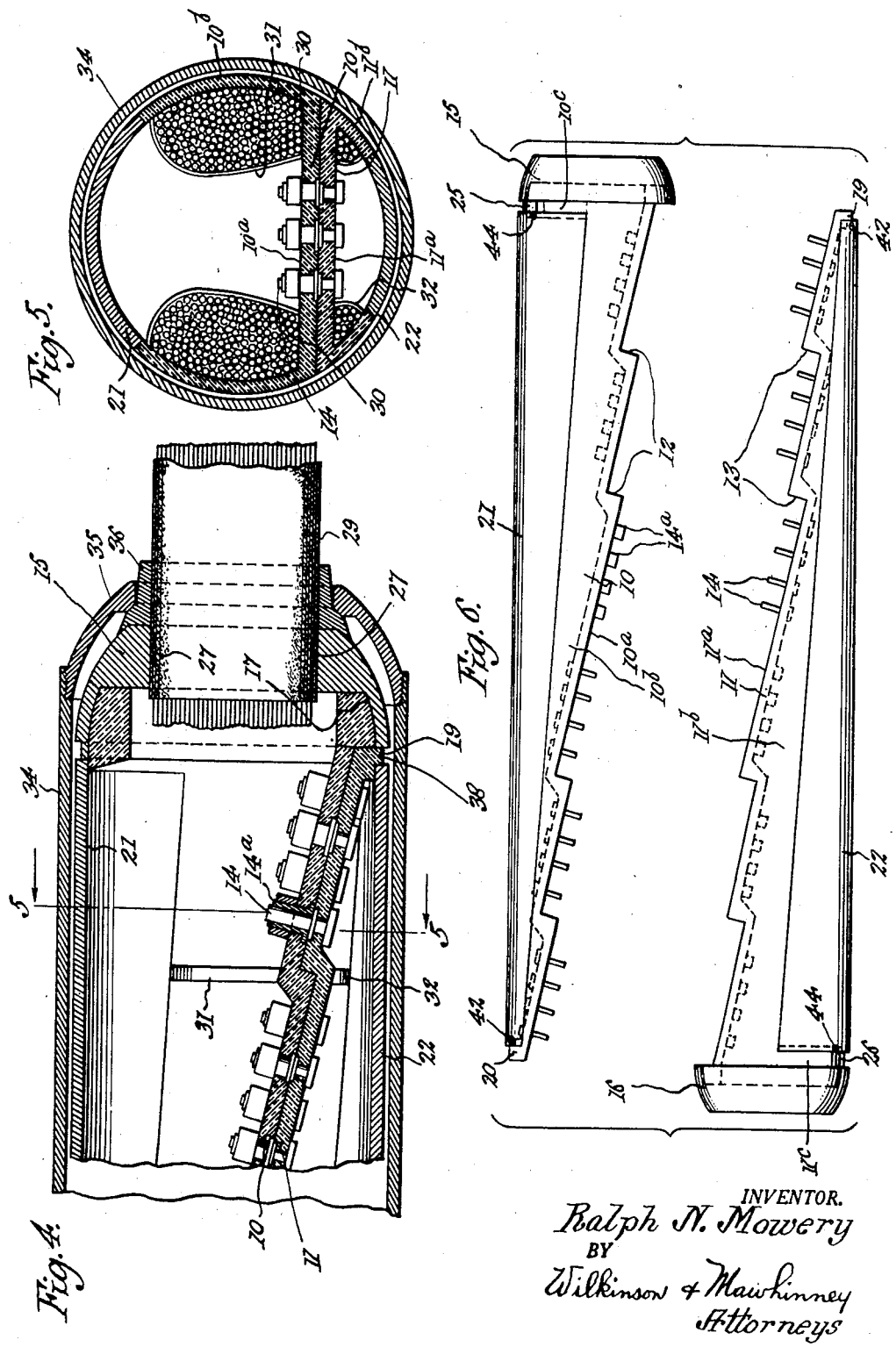
INVENTOR.
Ralph N. Mowery
BY
Wilkinson & Mawhinney
Attorneys Patented Mar. 9, 1948

2,437,358

UNITED STATES PATENT OFFICE 2,437,358

CABLE SPLICE

Ralph N. Mowery, Yakima, Wash.

Application May 5, 1947, Serial No. 746,130

9 Claims. (Cl. 174—88)

1

The present invention relates to improvements in cable splice and more particularly to an improvement in the connection of multiple-wire cable used for electrical impulse communication, and also for use in connecting high-voltage armored and emergency cables for power transmission.

An object of the invention is to provide an improved splice which will facilitate the rapid laying of cable over long distances in normal service requirements, and the laying of emergency service rubber-covered cable to restore service when disasters destroy normal communications.

It is another object of the invention to provide in the use of this multiple-wire cable connector blocks that are exactly alike and consist of mutually identical separable half-sections adapted to fit together in either endwise position of the connector with respect to the cable to be laid whereby the cable may be laid from either of the two connector ends with assurance that the connectors on either end will fit the connectors of the ones they must tie into.

A further object of the invention resides in providing an improved connector of simple and economical construction of few parts having easy separability whereby the strands of the two cables may be quickly connected separately to two connector members, which members are later assembled to provide good electrical contact from one cable to the other and with high insulating qualities to prevent short circuiting externally of the cable or connector blocks.

With the foregoing and other objects in view, the invention will be more fully described hereinafter and more particularly pointed out in the appended claims.

In the drawings, in which like parts are denoted by the same reference characters throughout the several views, Figure 1 is a longitudinal section taken horizontally through an improved cable splice construction according to the present invention.

Figure 2 is a similar view taken vertically through the improved construction.

Figure 3 is a side elevation of the two connector members shown partially taped together.

Figure 4 is a fragmentary vertical section taken on an enlarged scale.

Figure 5 is a transverse section taken on the line 5—5 in Figure 4.

Figure 6 is a side elevational view of the two members of the splice construction separated.

Referring more particularly to the drawings, 10 and 11 designate the two connector blocks,

2 preferably of insulating material, the same being diagonally disposed with reference to the axes of the cable or the axis of the splice device. Such blocks are separable, as indicated in Figure 6, and are shouldered or stepped as indicated at 12 and 13 to provide a series of oppositely disposed flat surfaces 10ª and 11ª, and carry plugs 14 and complemental sockets or receptacles 14ª adapted to electrically inner-fit when the connector blocks are brought together in longitudinal alignment so that their proximate faces abut one another as shown in Figures 2 to 5.

The flat surfaces 10ª and 11ª are disposed between the pairs of outwardly curved front and rear walls 10ᵇ and 11ᵇ. The outer edges of these walls are spaced apart and extend lengthwise along the blocks in an angular line relative to one another substantially the entire length thereof. Each pair of walls has the outwardly curved connections 10ᶜ and 11ᶜ adjacent one end, and these ends of the blocks are shaped to form the circular bearing heads 17 and 18 for seating the same within the respective ring bases 15 and 16 which support the blocks. The tip ends 20 and 19 of the blocks extend outwardly and provide an abutment to contact with the narrow free end of the part-circular covers 21 and 22. The blocks are shouldered at 40 and 41 to support the covers and permit the same to be held thereto by the screws 42.

The ring bases 15 and 16 are preferably made of metal and are provided with openings 27, the axes of which register and are aligned with the axis of the splice device. The ring bases are provided with the outwardly projecting arc shaped flanges 25 and 26 in which the thickness of the metal is reduced from the exterior. These flanges overlap the wall connecting portions of the bearing heads 17 and 18 and form an abutment to contact the enlarged ends of the part-circular covers 21 and 22 which are held by screws 44 to the outwardly curved wall connectors 10ᶜ and 11ᶜ in spaced relation with the ring bases 15 and 16.

The shoulders 40 and 41 provide narrow seats slightly below the outer tip ends 20 and 21 to connect or merge on a level with one end of the outer edges of the respective pairs of spaced apart walls. The circular bearing heads 17 and 18 connect the outer end of the respective pairs of spaced apart walls. The narrow ends of the part-circular covers 21 and 22 are readily inserted to abut the outer tip ends 20 and 19 and fastened to the shoulders 40 and 41 with their outer inclined edges aligned to rest upon the respective inclined edges of each pair of spaced walls on the blocks 10 and 11. The other end of the part-circular cover plates is supported and fastened to the part-circular wall connecting portions adjacent the circular bearing heads 17 and 18. The blocks 10 and 11 with their covers fastened in this position provide a pair of independent and enclosed housings to give assured protection to the plugs 14 along with their complemental sockets housed therein.

The cables 28 and 29 are let in through the openings 27, the insulation having been stripped from the cables in the usual way and the cable strands or wires 30 untwisted into substantially parallel bundles which are divided substantially equally to opposite sides of the connector block 10 or 11 and are held in clamps 31 or 32. The individual wires are fastened to the binding posts of the respective plugs 14 and sockets 14ᵃ.

As shown in Figure 3, the connector blocks 10 and 11 complete with covers 21 and 22 when assembled constitute the splice unit and may be secured together by tape 33 preferably; also the unit is enclosed in a casing or housing 34 which may or may not have the end heads 35 threaded or otherwise connected thereto and positioned to compress the washers or gaskets 36 about the cables where the same enter through the ring bases 15 and 16.

In the use of the device, in Figures 1 and 2 the steel emergency housing 34 is shown in place over the two connector blocks 10 and 11 as it would be placed when an emergency rubber-covered line is laid. The tip of the upper block 10 is preferably exactly the same as the tip or free end of the lower block 11. The measurement of exact similarity is made from the center line A—A in Figure 2, which is equidistant from the ring bases 15 and 16 and is made on the transverse median line of the contacting faces of the connector blocks 10 and 11. Such connector blocks are shown in five stepped sections comprising four relatively short sections at the ends of the device and a single long section at the central portion of the device although an increase or decrease in the number of steps may be made to facilitate using increasingly larger or smaller numbers of wires. The line A—A divides this central stepped section at its intermediate part. This center line A—A is an important consideration in the working of all connectors and the principle of the connectors.

The steel caps or end heads 35 may be threaded into the housing 34 to exert pressure of the inner portions or lips against rubber or other compressible washers 36, thus serving to temporarily waterproof the connector until regular service may be reinstalled. This outer housing 34 is used only for temporary lines that have rubber-covered cables.

The steel bases 15 and 16, as indicated in Figure 3, may contain two screw-driven wedges 37 to hold the weight of the rubber-covered cables, but the same are not required for lead-covered cables.

The separated wires 30 from the cables 28 and 29 are held by the clamps 31 and 32 along the sides of the connector blocks 10 and 11 up to the face plate in which the plugs for the individual wires are located. The connections between the wires 30 and the plugs 14, 14ᵃ are serviced by removing the connector block covers 21, 22. These covers are tapered from end to end as indicated.

When the unit is in service and only one or two wires require servicing, the connector block covers 21, 22 may be removed for direct servicing and the two units held together by securing a horseshoe clamp across the apertures or gaps 25 and 26 so that positive contact may be assured while the unit is open for inspection and servicing.

The proximate contacting faces of the blocks 10 and 11 are in angular step-down sections to locate the faces so that any strain upon the unit will be taken by the body of the unit instead of by the plugs individually. The male plugs 14 may be set in the faces of the tip halves of the connector blocks 10 and 11, and the female plugs 14ᵃ may be set in the faces of the base halves of the connector blocks. Such plugs have their axes perpendicular to the faces on which they are set. The male plugs 14 and the female plugs 14ᵃ are set geometrically opposed to each other in exact distance from the center line, and that distance being perpendicular to the center line, as measured on the angular faces, the faces of the blocks are on parallel planes.

A lead housing may of course replace the steel housing 34. Lead housings may be of the normal service type. The cloth tape 33 may be wrapped about the unit to secure solid connection while the lead housing is being fixed over the unit. Figure 3 shows two connectors and their covers in true cylindrical form upon connection together.

Figure 1 shows parts broken away to indicate one of the connector blocks revealed for servicing. The separated wires 30 are shown harnessed to the sides of the blocks by the clamp 31 in order to remove any strain from the plug connections that might otherwise break a connection by the pull on the cable. The plug area is also cleared of excess wires by the retention of the lead-in wires to the sides of the block.

In Figure 6 the two connector blocks 10 and 11 and their covers 21 and 22 are shown separated to indicate the alignment of the faces and the location of the respective male and female plugs 14 and 14ᵃ.

The invention improves the efficiency over other connector types in a number of particulars. For instance, the connector is more compact and reduces the volume of space required for the same. The use of stepped-down angular faces insures firm connection. The cylindrical shape of the connectors when assembled will permit the connectors to be pulled through conduit or piping where necessary. The connectors may be assembled to the cables at the factory and quickly and economically checked to insure that both cable and connector function properly before release for use.

Two cables can be quickly connected together when being put into use which results in a saving of time. The cables may also be quickly checked for breaks of one or two wires by removing the outer housing and connector covers and checking the plugs directly. The number of wires that may be connected with this system may be varied by manufacturing connectors longer or shorter in length and changing the width correspondingly to contain the wires and connector plugs.

Either single wire plugs or multiple-conductor plugs may be used. The connector blocks take the strain of any pulls on the cable and prevent individual wire breaks. Cable replacement may be quickly and economically made when required.

While I have disclosed herein the best form of the invention known to me at the present time, I desire it to be understood that I reserve the right to make changes and modifications in the herein described embodiment of the invention provided such changes fall within the scope of the following claims.

What I claim is:

1. A cable splice comprising a pair of connector blocks having wire connecting means with outer walls, circular bearing heads carried by the blocks, covers for the outer walls, and perforated ring bases having internal seats for mounting the bearing heads to carry said blocks and covers.

2. A cable splice as claimed in claim 1 characterized by the fact that the blocks are diagonally disposed with reference to the direction of cable axis.

3. A cable splice according to claim 2 wherein the blocks are stepped and shouldered to provide oppositely disposed series of flat surfaces.

4. A cable splice according to claim 2 in which the tip end portions of the blocks have shouldered surfaces to removably receive the tip ends of the covers.

5. A cable splice according to claim 2 in which the covers taper toward the tip ends.

6. A cable splice according to claim 2 in which the transverse center line of the splice runs through the central part of intermediate contacting faces of the blocks which are approximately twice the length of the other stepped contact faces of the blocks.

7. A cable splice according to claim 2 in which clamps at the sides of the blocks hold the divided cable wires laterally off the faces of the blocks.

8. A cable splice according to claim 2 in which a tape passes spirally about the blocks to hold the splice together.

9. A cable splice according to claim 2 in which a tubular housing fits over the splice, with end heads screwed into the housing having apertures for the cable and lips to engage compressible gaskets for compressing the latter against the ring bases and the cable ends.

RALPH N. MOWERY.